J. A. WILLIAMS.
CONTACT POINT.
APPLICATION FILED AUG. 9, 1915.
1,236,523.
Patented Aug. 14, 1917.
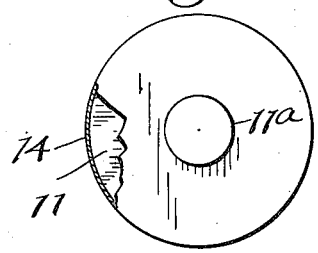
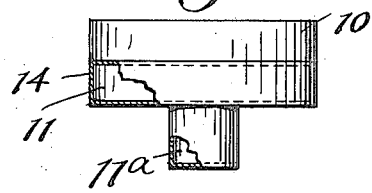
Inventor
Joseph A. Williams
By Thurston & Kwis
attys.

UNITED STATES PATENT OFFICE.

JOSEPH A. WILLIAMS, OF CLEVELAND, OHIO.

CONTACT-POINT.

1,236,523.

Specification of Letters Patent. Patented Aug. 14, 1917.

Application filed August 9, 1915. Serial No. 44,506.

*To all whom it may concern:*

Be it known that I, JOSEPH A. WILLIAMS, a citizen of the United States, residing at Cleveland, in the county of Cuyahoga and State of Ohio, have invented a certain new and useful Improvement in Contact-Points, of which the following is a full, clear, and exact description.

This invention relates to an electrical contact or contact point adapted to be employed in various kinds of electrical apparatus, and particularly in vibrators and circuit breakers of ignition apparatus.

The object of this invention is to provide a contact point having a heat resisting non-oxidizable tip united to a base or carrier in such a way that the contact point is durable, reliable and efficient in action, and can be produced at a less cost and more satisfactorily than heretofore.

The invention may be briefly summarized as consisting in certain novel details of construction and combinations and arrangements of parts which will be described in the specification and set forth in the appended claims.

In the accompanying sheet of drawings Figure 1 is a side view and Fig. 2 is a bottom view of a contact point constructed in accordance with my invention, parts being broken away.

The contact point constructed in accordance with my invention is composed of an element 10 which has a very high fusing temperature and is not easily oxidized, and a base 11 carrying the element 10 and firmly united thereto in the manner hereinafter explained.

For the element or part 10, which for convenience will be termed the arcing element, I prefer to employ tungsten, although some of the other rare metals such as platinum can be used but not so effectively as tungsten, and for the base 11 I prefer to employ relatively soft iron preferably in the form of a so-called tack having a neck or shank 11ª by which it may be riveted to a support or holder by inserting the neck in the holder and upsetting the same. Both the arcing element and base are preferably, but not necessarily, circular or disk shaped.

The contact point is formed of the two elements or parts 10 and 11 principally because any metal or substance such as tungsten which has the necessary high fusion temperature and does not oxidize under the heat of an electric arc, is so exceedingly hard that it cannot in practice be directly united by riveting or the like to the supporting or holding means. Furthermore, for the same reason, *i. e.*, because of the extreme hardness of the material of which the arcing element is composed, in practice it cannot be thoroughly or effectively united to the base 11, except by a brazing or soldering process.

I have found that copper is the best bonding or brazing material for uniting the arcing element 10 to the base 11, and I have found also that if it is attempted to braze the two elements together by means of copper used in the ordinary way, by placing a disk or thin sheet of copper between the two elements and then subjecting the same to a heating process which fuses the copper and causes it to adhere both to the arcing element and to the base, the two elements are effectively united, but the fused copper flows and flashes onto and over the tungsten so that after the bonding is completed and the parts have cooled, various parts of the external surface of the tungsten element are coated with strongly adhering particles of copper. Inasmuch as the efficiency and value of a contact point is very much decreased and practically destroyed if the contact point has even a trace of copper adhering to the active or arcing surface or surfaces thereof, it is essential that the contact point whose arcing element is brazed to the base in the manner above stated be subjected to a pickling process, *i. e.*, by placing the same in an acid bath which will dissolve or eat away the copper which adheres to the tungsten. I have found that this does clean the copper from the tungsten, or the major part of the copper, but it has the very serious disadvantage that it eats away the copper from between the tungsten and the base, thus mechanically and electrically weakening the contact point. There are further disadvantages arising from the use of this acid bath or pickling process, and among these might be mentioned, it is expensive and it is difficult to subsequently remove the acid which has crept into the crevice or narrow space between the arcing element and the base.

I overcome all the above mentioned disadvantages, *i. e.*, I avoid entirely the flashing or flowing of the copper bond onto the tungsten or other arcing element by my invention which will now be described.

In producing my improved contact point instead of using a sheet or disk of copper simply placed between the two elements to be united, I coat the base with a thin layer of copper 14 preferably by an electroplating process. Preferably the copper 14 is applied to the entire surface of the base in a thin coat less than one-thousandth of an inch in thickness. Then the contact tip or arcing element is placed on the base thus coated with copper and the two elements are inserted in a furnace until the copper coat is fused, and this very effectively unites or bonds the tungsten to the base. But there is this important difference between the results thus obtained and results obtained if the parts are brazed by simply placing a layer or disk of copper between the elements, that when the copper is applied as a thin coat onto the base and when the copper is fused, absolutely none of the copper flows or flashes onto the tungsten, and when the contact point is removed from the furnace the external surface of the tungsten is absolutely clear or free of the copper, and thus the necessity for subjecting the contact point to the pickling process is entirely eliminated. I find that the copper which is fused remains and flows solely on the base, some of the copper running down the shank or neck of the base forming a slight fillet at the point where the shank joins the body of the base, and otherwise slightly increasing the thickness of the copper coat along the shank.

While I cannot with absolute certainty explain why none of the copper flows or flashes onto the arcing element, I believe that it is due to a sort of surface tension which exists in the fused copper which entirely covers the base and prevents it flowing onto the tungsten. Furthermore, when the copper is fused the entire surface of the base is in a liquid state, whereas the surface of the tungsten or arcing element is dry and solid, so that there is a much easier path of flow on the base than onto and along the tungsten. However, whether or not the above theory or explanation is correct is believed to be immaterial, for the fact remains that with my improved contact point when the latter is removed from the furnace, the tungsten does not contain any evidence or trace of copper on its external surface, and is ready for use. I thus eliminate the necessity for the pickling process and secure a better process.

Having thus described my invention, what I claim is:—

1. A contact point composed of a piece of tungsten brazed to a base by brazing material applied in the form of a coating which covers the portion of the base adapted to receive the contact point, and adjacent portions of the base.

2. A contact point composed of a piece of tungsten brazed to a base by brazing material applied in the form of a coating entirely covering the base.

3. A contact point composed of a piece of tungsten brazed to a copper plated iron base the copper being applied in a thin coating which covers the portion of the base adapted to receive the contact point and adjacent portions of the base the said copper constituting a bond between the tungsten and the base.

In testimony whereof, I hereunto affix my signature.

JOSEPH A. WILLIAMS.